United States Patent [19]

Davis

[11] 4,442,390

[45] Apr. 10, 1984

[54] FEEDBACK SYSTEM FOR A LINEAR ACTUATOR

[76] Inventor: Kenneth W. Davis, HHB 2/42 FA BN, APO New York, N.Y. 09751

[21] Appl. No.: 395,383

[22] Filed: Jul. 6, 1982

[51] Int. Cl.³ .............................................. G05B 1/06
[52] U.S. Cl. ...................................... 318/663; 318/9; 318/687; 74/89
[58] Field of Search ................ 74/89, 89.11, 198, 513; 318/663, 9, 15, 687

[56] References Cited

U.S. PATENT DOCUMENTS

| | | | |
|---|---|---|---|
| 2,625,633 | 1/1953 | Warsher | 201/62 |
| 3,470,431 | 9/1969 | Jones | 318/663 |
| 3,541,541 | 11/1970 | Engelbart | 340/324 |
| 3,663,881 | 5/1972 | Ehrenfried et al. | 318/663 |
| 3,704,405 | 11/1972 | Miller et al. | 318/663 X |
| 3,750,134 | 7/1973 | Weisend | 340/324 |
| 3,835,464 | 9/1974 | Rider | 340/324 |
| 3,857,079 | 12/1974 | Wake et al. | 318/663 |
| 3,987,685 | 10/1976 | Opocensky | 74/471 |
| 4,036,323 | 7/1977 | Schmall | 108/105 |
| 4,223,624 | 9/1980 | Iyeta | 114/144 |
| 4,248,011 | 2/1981 | Shimamura | 46/254 |
| 4,248,101 | 2/1981 | Santoro | 74/89 |
| 4,250,440 | 2/1981 | Lee | 318/614 |
| 4,274,038 | 6/1981 | Sawyer | 318/663 |
| 4,388,576 | 6/1983 | Blatt | 318/15 |

FOREIGN PATENT DOCUMENTS 586421 12/1977 U.S.S.R. .

Primary Examiner—B. Dobeck
Attorney, Agent, or Firm—Darrell E. Hollis

[57] ABSTRACT

A feedback system is disclosed for use in a remote control linear actuator device including a pair of actuator members that are relatively linearly displaceable by a motor, which feedback system includes a mounting bracket connected with one of the actuator members, a slide bar connected with the mounting bracket for linear movement by the other actuator member in a direction parallel with the direction of relative movement of said actuator members, and a rotary member operable by the slide bar to supply a feedback signal to the motor that is a function of the relative positions of the actuator members.

11 Claims, 4 Drawing Figures

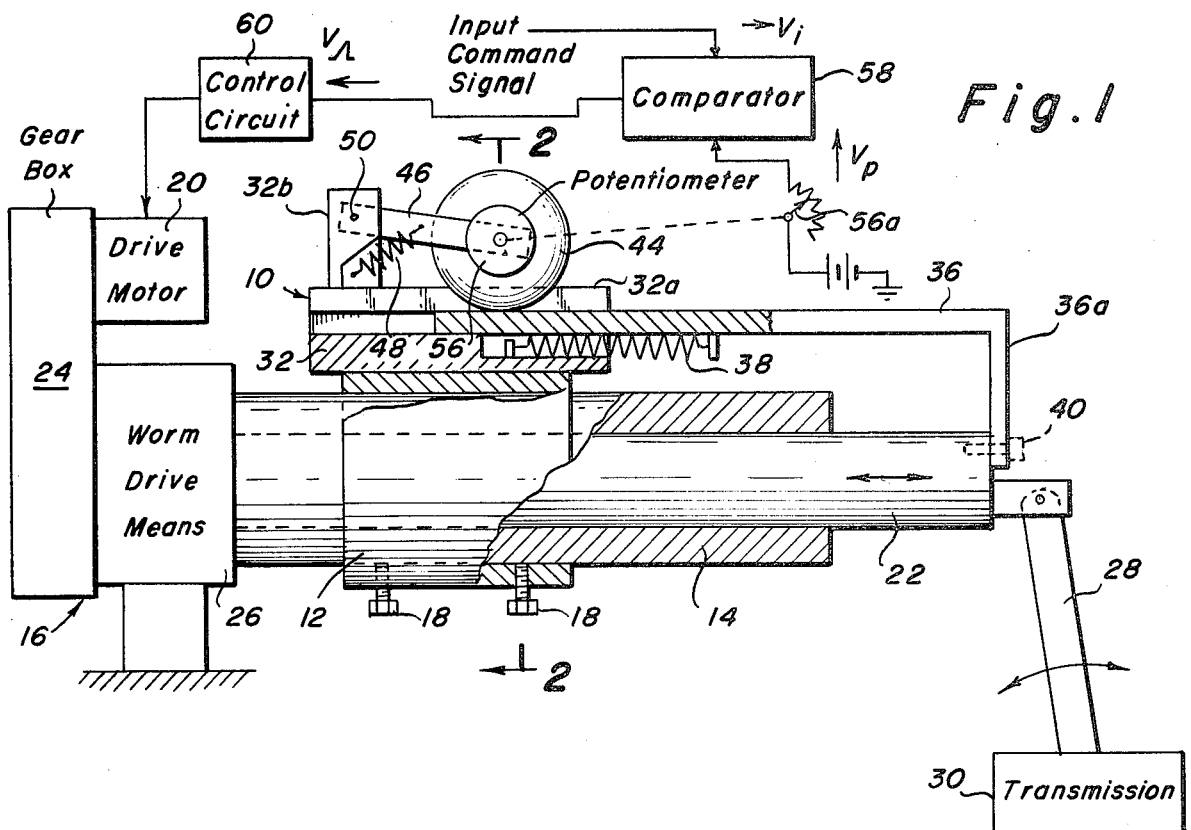
Fig.1
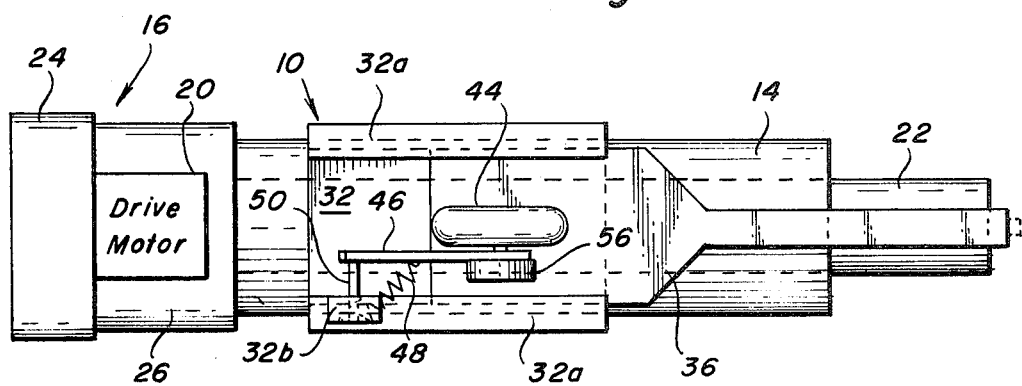
Fig.3
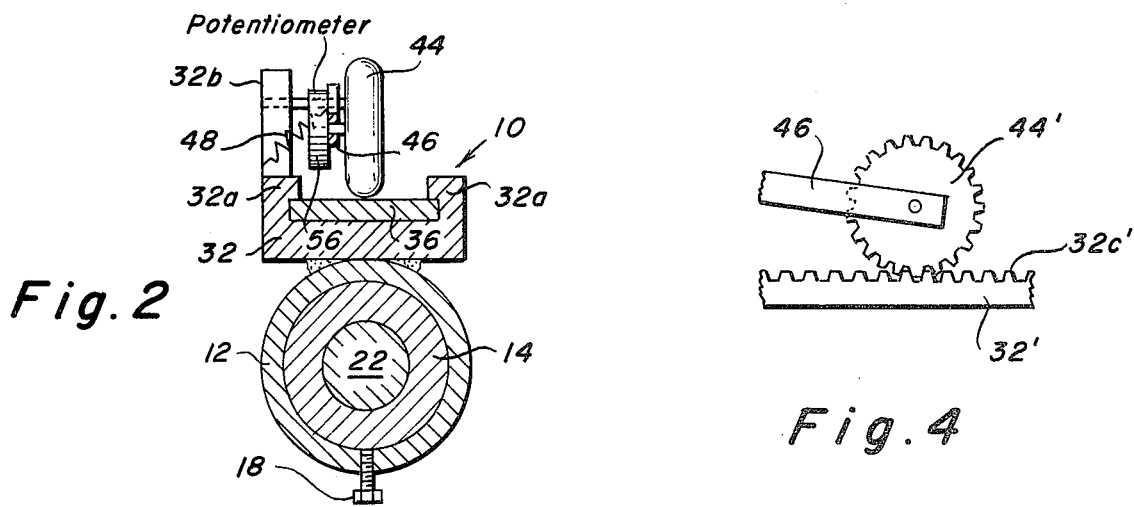
Fig.2
Fig.4

FEEDBACK SYSTEM FOR A LINEAR ACTUATOR

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

BRIEF DESCRIPTION OF THE PRIOR ART

The use of closed-loop automatic control systems is well known in the machine tool art, as evidenced, for example, by the patents to Lee No. 4,250,440 and Ehrenfried et al No. 3,663,881, and the use of potentiometers in position sensing systems is broadly disclosed by the patents to Rider No. 3,835,464, Warsher No. 2,625,633, Weisend No. 3,750,134, Wake et al No. 3,857,079 and the Russian Patent No. 586,421. Remote controlled systems broadly are known in the art, as taught by the patent to Shimamura No. 4,248,011, and the use of signal comparison means in automatic vehicle steering systems is shown by the patents to Schmall No. 4,036,323 and Iyeta No. 4,223,624.

While these systems are generally satisfactory in operation, their use is somewhat limited in scope as to actual applications in the field, since they do not readily lend themselves to quick and simple installation on remote control components of existing equipment.

SUMMARY OF THE INVENTION

The present invention is directed to a simple mechanical feedback mechanism that is adapted for mounting on various types and sizes of electro-mechanical linear actuators that perform different remote control functions.

Accordingly, a primary object of the present invention is to provide a mechanical feedback system for linear actuators, including a mounting bracket adapted for mounting on one of the actuator members, a slide bar slidably connected with the mounting bracket for linear movement in a direction parallel with the axis of relative linear movement of the actuator members, said slide bar being arranged for displacement by the other actuator member, a rotatable member operable upon displacement of said other actuator member, and feedback means including a potentiometer operable by the wheel for controlling the operation of the actuator motor as a function of the relative positions of said actuator members. The slide bar includes an orthogonally arranged end portion that extends adjacent the end of the said other actuator member. In one embodiment, the slide bar is spring biased to effect engagement of the slide bar orthogonal portion with the end of the other actuator member, and in another embodiment, the orthogonal portion is bolted directly to the other actuator member.

According to a more specific object of the invention, the wheel that is operable by the slide bar is mounted at one end of a pivot lever that is biased to urge the wheel toward the slide bar. The wheel is preferably formed of a resilient material in this embodiment. Alternatively, rack and pinion means may be provided to effect a more positive connection between the wheel and the slide bar. In either case, the wheel operates the movable tap of a rotary type of potentiometer that is connected with a comparator which compares a position-responsive feedback signal with the incoming remote control command signal, thereby to control the operation of the actuator drive motor.

In the closed loop servo control system controlled by the sensor means of the present invention, command signals from the operator are received by the comparator, which also receives signals from the feedback sensor. The feedback sensor tells the system of the actual position of the actuator while the control input signal tells the system what position of the actuator is desired. The comparator develops an error signal which is proportional to the difference in the two positions. This error signal is applied to the control circuit, where it is amplified and applied to the drive motor which moves the actuator. The actuator moves and continues to move until the actual and the desired position input signals are identical. At this time, the control circuit does not receive any input and the drive motor/actuator stops. In one application, two identical feedback systems are used with a standard moving rail target, one mechanism serving to control the brake, clutch and throttle, and the other mechanism controlling the gear shifting means. The apparatus may be used in the remote-control steering of a tank, for operating a gear selection lever, for raising a rocket launcher, or controlling the brake and throttle devices of a command and reconnaissance vehicle.

BRIEF DESCRIPTION OF THE DRAWING

Other objects and advantages of the invention will become apparent from a study of the following specification when viewed in the light of the accompanying drawing, in which:

FIG. 1 is a partly sectioned side elevation view of the position sensing apparatus of the present invention mounted on an electro-mechanical actuator device;

FIG. 2 is a sectional view taken along line 2—2 of FIG. 1;

FIG. 3 is a top plan view of the apparatus of FIG. 1; and

FIG. 4 is a detailed view of a modification of the position sensing apparatus of FIG. 1.

DETAILED DESCRIPTION

Referring first to FIGS. 1-3, the position sensing apparatus 10 of the present invention includes a tubular mounting bracket 12 mounted concentrically upon the stationary tubular outer member 14 of an electro-mechanical actuator device 16 by a pair of set screws 18 at a given position. As is conventional in the art, the electro-mechanical actuator device 16 is of the remote control type including a drive motor 20 for longitudinally displacing the actuator inner member 22—via gear box 24 and worm drive means 26—in opposite linear directions relative to the outer acutator member 14. In the illustrated embodiment, the inner member 22 is connected at its free end with the gear shift lever 28 of transmission means 30.

The position sensing apparatus further includes a guide member 32 welded to the mounting bracket 12, said guide member including parallel longitudinally extending guide flange portions 32a that define a guide track in which is slidably mounted at one end the slide bar 36, said guide track being parallel with the axis of displacement of the inner actuator member 22. The other end of the slide bar includes an orthogonally extending portion 36a that terminates adjacent the free end surface of the inner actuator member 22. In the illustrated embodiment, tension spring 38 connected between the guide member 32 and the slide bar 36 biases the slide bar to the left in FIG. 1, thereby urging the orthogonally arranged slide bar portion 36a into engagement with the end extremity of inner actuator member 22. Alternatively, the end portion 36a could be bolted to the inner actuator member 22 (for example, by bolt 40, as shown in phantom in FIG. 1).

Mounted for rolling frictional engagement with the planar upper surface of slide bar 36 is a wheel 44 formed of a suitable resilient material (such as synthetic rubber or the like). The wheel is rotatably mounted at one end of a pivot arm 46 the other end of which is connected with vertical bracket portion 32b of the guide member 32. Tension spring 48 biases pivot arm 46 in the clockwise direction about pivot axis 50 of FIG. 1, thereby to bias wheel 44 into positive engagement with the upper surface of slide bar 36. Connected for operation by the rotary wheel 44 is the movable tap member 56a (FIG. 1) of rotary-type potentiometer 56 the stationary body portion of which is rigidly secured to pivot arm 46.

The potentiometer voltage Vp is supplied to one input terminal of voltage comparator means 58 for comparison with the remote control input command signal Vi that is supplied to the other input terminal, the resultant voltage Vr being supplied to the input terminal of control circuit 60 having an output terminal connected with the drive motor 20.

OPERATION

In operation, a remote control input command signal Vi for operating the gear shift lever 28 of transmission 30 is supplied to drive motor 20 via comparator 58 and control circuit 60. The drive motor is operated in a direction to effect the desired linear displacement of actuator member 22 relative to the outer actuator member 14. This linear displacement of actuator member 22 produces a corresponding linear displacement of slide bar 36 which results in a corresponding rotary movement of wheel 44, thereby adjusting the position of the variable tap 56a of potentiometer 56. The potentiometer feedback signal Vp is compared with the input signal Vi by comparator 58, until the desired position has been reached by actuator member 22. The operation of the closed loop servo control system is conventional in the art.

Referring to the modified embodiment of FIG. 4, in order to obtain a more positive connection between the slide bar and the potentiometer operating means, the wheel 44' may be in the form a a pinion for engagement with a rack 32c' extending longitudinally across the upper surface of the guide member 32' for the slide bar.

While the preferred forms and embodiments of the invention have been illustrated and described, it will be apparent that changes and modifications may be made without deviating from the inventive concepts set forth above.

What is claimed is:

1. Feedback means for use in connection with linear actuator means including a pair of relatively linearly displaceable actuator members, and motor means for displacing one of said actuator members relative to the other, comprising
  (a) sensing means for sensing the position of said one actuator member relative to the other member, said sensing means including
    (1) mounting bracket means adapted for mounting on said other actuator member;
    (2) a slide bar connected for longitudinal displacement relative to said mounting bracket means in a direction parallel with the direction of displacement of said one actuator member relative to said other member, said slide bar including a portion arranged for operation by said one actuator member during the linear displacement thereof relative to said other member; and
    (3) a rotary member connected with said mounting bracket means for rotation by said slide bar during the linear displacement thereof relative to said mounting bracket means, the axis of rotation of said rotary member being contained in a plane normal to the axis of linear displacement of said one actuator member; and
  (b) feedback means operable by said sensing means for controlling the operation of said motor means as a function of the position of said one member relative to the other member.

2. Apparatus as defined in claim 1, and further including pivot arm means connecting said rotary member for pivotal movement relative to said mounting bracket means about a pivot axis parallel with the axis of rotation of said rotary member.

3. Apparatus as defined in claim 2, and further including spring means bearing said pivot arm means toward a position in which said rotary member is in engagement with said slide bar.

4. Apparatus as defined in claim 3, wherein said slide bar has a planar surface adjacent said rotary member, and further wherein said rotary member comprises a resilient wheel in rolling engagement with said planar surface.

5. Apparatus as defined in claim 3, and further including rack and pinion means connecting said rotary member for rotation by said slide bar.

6. Apparatus as defined in claim 1, wherein said slide bar portion comprises an orthogonal portion arranged at one end of said slide bar and extending in the line of travel of said one member.

7. Apparatus as defined in claim 6, and further including spring means biasing said slide bar in a direction relative to said mounting bracket means to cause said orthogonal portion to engage the adjacent end surface of said one member.

8. Apparatus as defined in claim 1, and further including means connecting said slide bar with said one member for movement thereby.

9. Apparatus as defined in claim 1, wherein the relatively linearly displaceable members of said actuator means comprises a tubular outer actuator member, and an inner actuator member mounted for axial displacement within said outer member; and further wherein said mounting bracket means includes a tubular member mounted concentrically about said outer actuator member.

10. Apparatus as defined in claim 1, wherein said feedback means comprises a closed loop feedback circuit including a rotary-type potentiometer operable by said rotary member.

11. Apparatus as defined in claim 10, wherein said closed loop feedback circuit means further includes comparator means for comparing the output voltage of said potentiometer with an input command signal, thereby to produce a resultant signal, and control circuit means for varying the operation of said motor means as a function of said resultant signal.

* * * * *